United States Patent [19]
Bodin

[11] Patent Number: 5,948,988
[45] Date of Patent: Sep. 7, 1999

[54] PRESSURE TRANSDUCER WITH FLAME ARRESTER

[75] Inventor: Joel John Bodin, Chanhassen, Minn.

[73] Assignee: Honeywell Inc, Minneapolis, Minn.

[21] Appl. No.: 09/085,591

[22] Filed: May 27, 1998

[51] Int. Cl.⁶ .................. G01L 7/00; G01L 7/18
[52] U.S. Cl. .......................................... 73/706
[58] Field of Search ................................. 73/706

[56] References Cited

U.S. PATENT DOCUMENTS

| | | |
|---|---|---|
| 4,970,898 | 11/1990 | Walish et al. . |
| 5,287,746 | 2/1994 | Broden . |
| 5,439,021 | 8/1995 | Burlage et al. . |
| 5,524,492 | 6/1996 | Frick et al. . |
| 5,583,294 | 12/1996 | Karas . |

*Primary Examiner*—Joseph L. Felber
*Attorney, Agent, or Firm*—Gregory A. Bruns

[57] ABSTRACT

A pressure transducer with a flame arrester has a header with a sensor mounted at a surface within a cavity in the header. A diaphragm in contact with the fluid media to be measured seals the cavity. A flame arrester is shaped for receipt in the cavity and is surrounded by fill fluid. The flame arrester provides a flame-extinguishing path between the flame arrester and surface within the cavity.

20 Claims, 4 Drawing Sheets

/ 948,988

PRESSURE TRANSDUCER WITH FLAME ARRESTER

CROSS REFERENCE TO RELATED APPLICATIONS (IF ANY)

Not Applicable.

U.S. GOVERNMENT RIGHTS (IF ANY)

Not Applicable.

BACKGROUND OF THE INVENTION

1. Field of the Invention

The present invention relates generally to pressure transducers and specifically to a flame arrester for use with a pressure transducer.

2. Description of the Prior Art

Explosion-proof certification for a pressure transducer requires that flamepath joints be constructed between the internal volume of the enclosure and the external environment. Typically, an explosion-proof pressure transducer contains at least one joint where air, gas, or liquid enters or leaves the explosion-proof enclosure. This type of flamepath joint typically requires small gaps with minimum lengths between mating parts for the purpose of arresting flames if an internal explosion were to occur. The minimum lengths generally cause the sensor die to be mounted a significant distance from the process fluid. This distance increases the sensors response time to temperature changes within the process fluid. In the prior art, providing a flamepath joint also meant having a minimum two part welded construction. The first part typically is called a meter body that provides the construction of the flamepath joint. The second part is the header, which is welded to the meter body. The welding of these two parts is a delicate process because it's a high pressure joint and the welding heat often causes damage to the glass seals. Therefore, a need exists for a pressure transducer that provides flame arresting, mounts the sensor die close to the process fluid to decrease the response time to temperature changes, and removes the delicate weld that often damages the glass seals.

BRIEF SUMMARY OF THE INVENTION

The present invention solves these needs stated above by using one part construction. The one part provides the construction of the flamepath joint and is the header combined. The one part, which is being called the header, has a unique cavity for flame arresting, which accepts a unique flame arrester. It is the small gap and minimum length between the flame arrester and header that arrest the flames if an internal explosion were to occur. The unique flame arrester allows the sensing die to be mounted close to the process fluid. The mounting of the sensing die close to the process fluid decreases the response time to temperature changes. The unique flame arrester also allows one part construction, which eliminates the delicate weld that often causes damage to the glass seals.

DETAILED DESCRIPTION OF THE INVENTION

Figure 1:
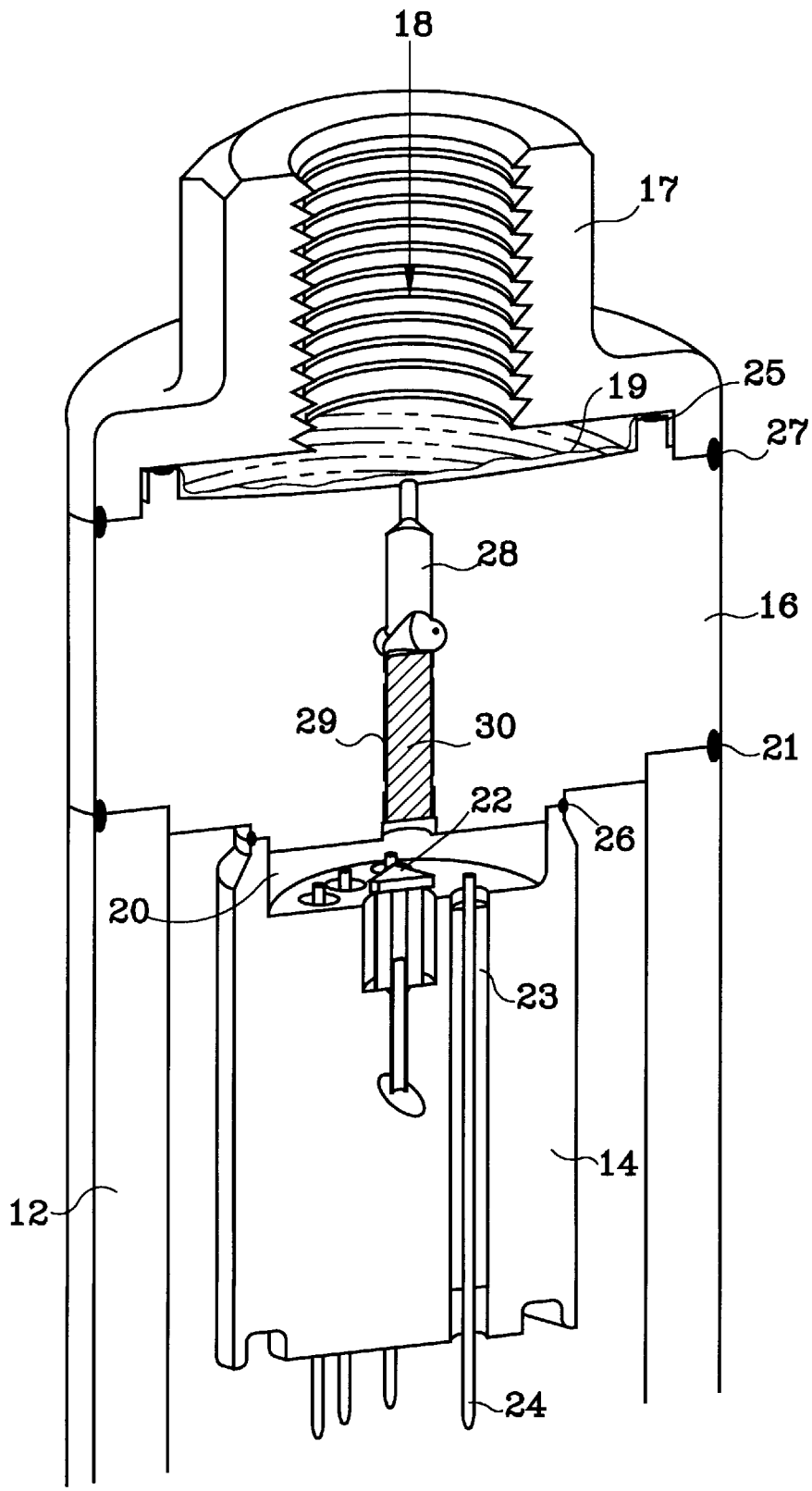
FIG. 1 shows a cross sectional perspective view of a pressure transducer including a meter body and header according to the prior art.

Referring to FIG. 1, a representative pressure transducer with welded two part construction as found in the prior art is shown. The first part, called a meter body 16, contains the flame arresting construction. The second part, called the header 14, is mounted to the meter body 16 at weld 26. Other parts involved in the construction of the pressure transducer from prior art include the housing 12, diaphragm 19, and adapter 17. The housing 12 is connected to the meter body 16 at weld 21. The diaphragm 19 is mounted to the meter body 16 at weld 25. The adapter 17 is welded to the meter body 16 at weld 27.

The meter body 16 contains a long small diameter axial hole 28, which accepts flame arrester 30. Flame arrester 30 is a long, cylindrical part made to press into hole 28 and have the proper small gap 29 between flame arrester 30 and hole 28, and the proper minimum length to comply with flame arresting requirements.

The header 14 includes a shallow wide diameter hole 20 to permit mounting and connecting of a sensor die 22 prior to weld 26. Electrical conductive pins 24 are connected to sensor die 22 by wirebond connections (not shown) and extend through header 14. The electrical conductive pins 24 are isolated from the header body 14 by glass seals 23. Other electrical connections (not shown) are made at the other end of conductive pins 24.

The adapter 17 allows process fluid 18 to enter the pressure transducer and contact the diaphragm 19. The diaphragm 19 acts as a barrier between process fluid 18 and non-compressible fluid, e.g., oil. Oil fluid fills the space under the diaphragm 19, in hole 28, inside the small gap 29, and the shallow wide diameter hole 20. The oil fluid transfers the pressure from the process fluid 18 to the sensor die 22.

The minimum length requirement of the small gap 29 surrounding flame arrester 30 causes the sensor die 22 to be mounted a considerable distance from the process fluid 18, the pressure of which is being measured. This distance causes a delay in the sensor die 22 attaining the temperature of the process fluid 18. Sensor die 22 is temperature compensated to provide accurate readings when sensor die 22 is at the temperature of the process fluid 18. Thus, this distance increases the response time of the sensor die 22 to temperature changes in the process fluid 18.

The header 14 is secured to meter body 16 by weld 26. Weld 26 is a delicate weld because of the proximity of weld 26 to glass seals 23. The heat generated by weld 26 causes damage to the glass seals 23 because of the temperature related stresses caused by welding.

Figure 2:
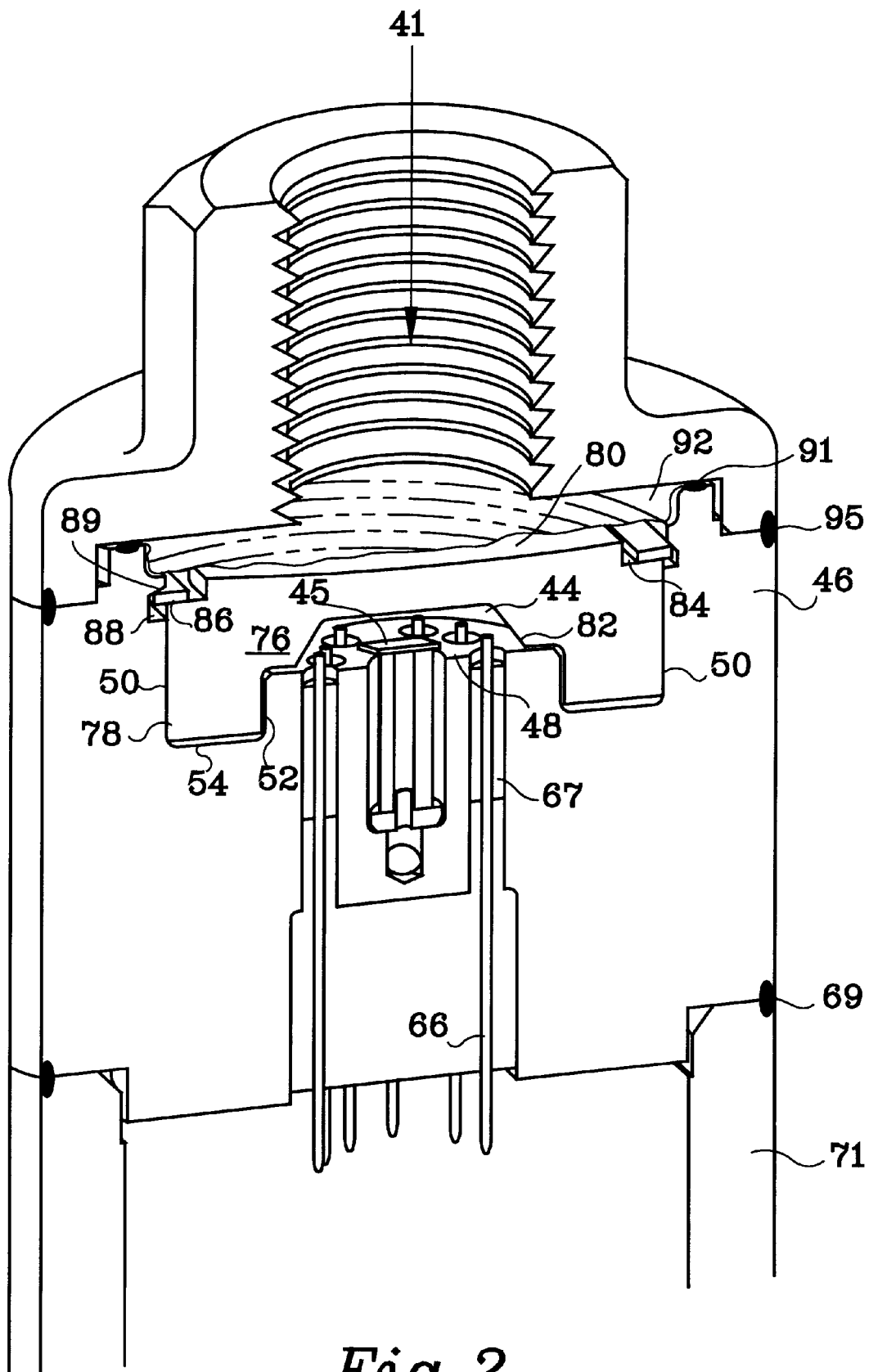
FIG. 2 shows a cross sectional perspective view of a pressure transducer including the header according to the principles of the present invention.
Figure 3:
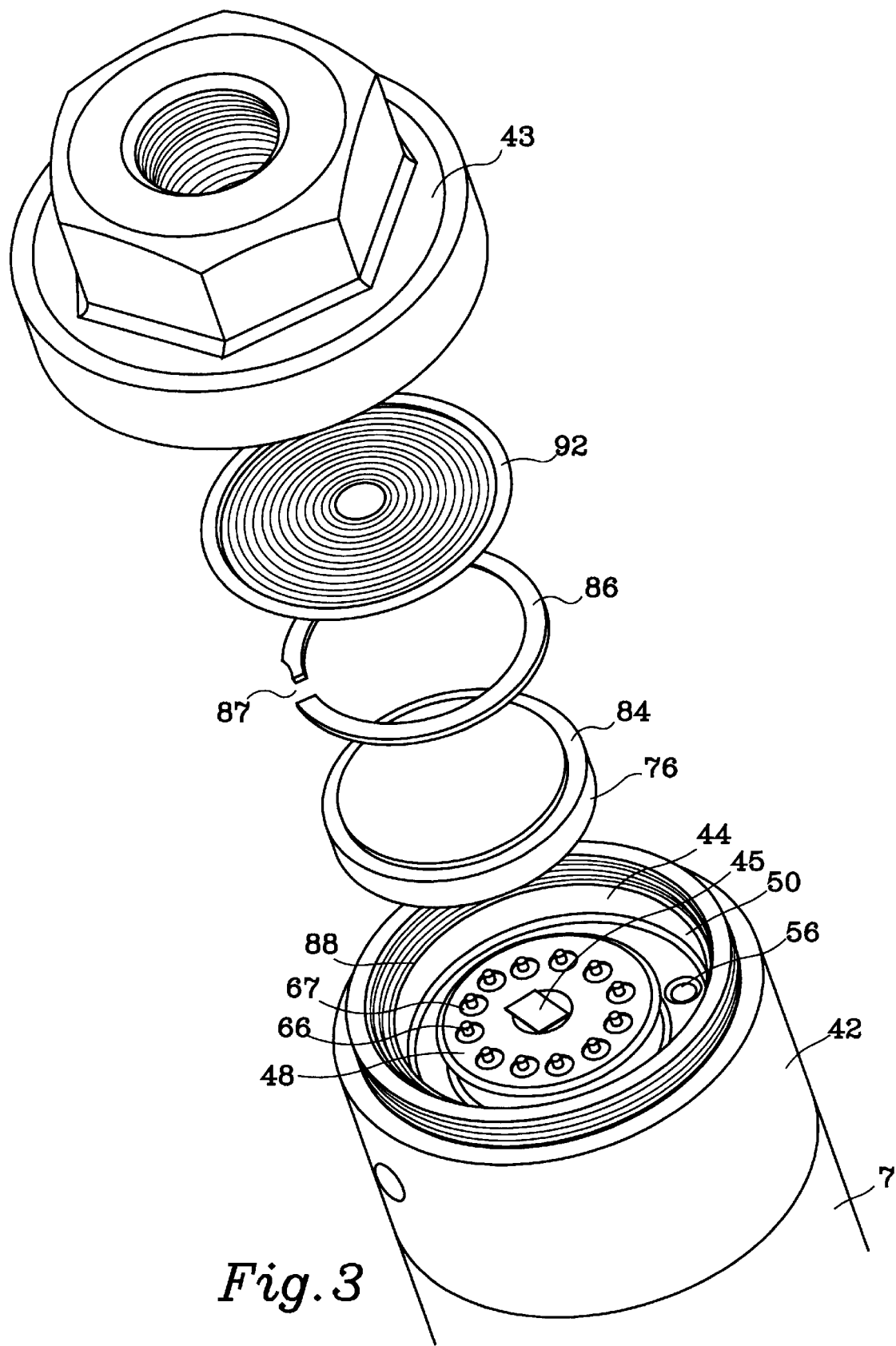
FIG. 3 shows an exploded perspective front view of the device of FIG. 2.
Figure 4:
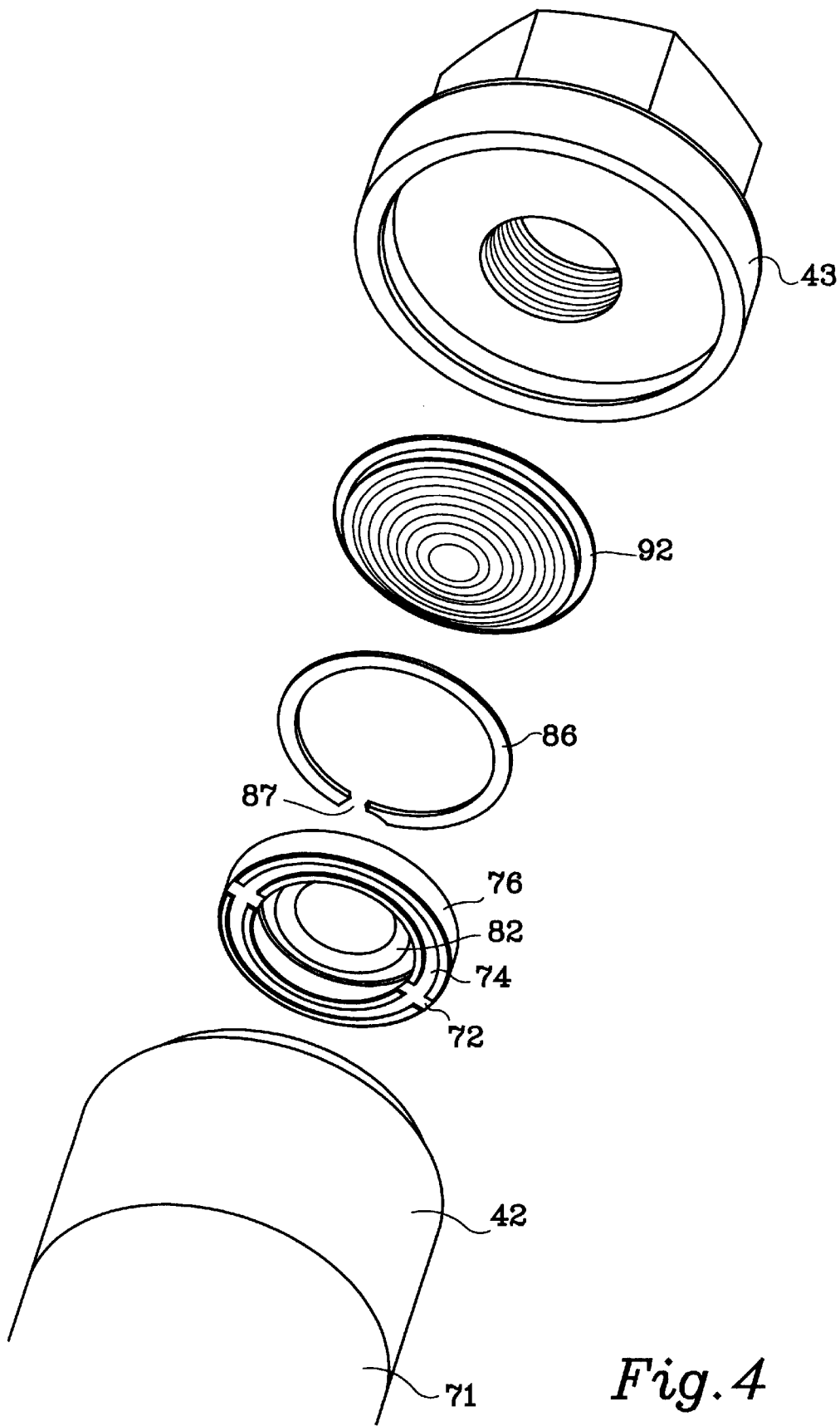
FIG. 4 shows an exploded perspective back view of the device of FIG. 2.

FIG. 2, 3, and 4 show a pressure transducer with a single part construction according to the present invention. The one part, called a header 42, provides the flame arresting construction and the header combined. Other parts involved in the construction of the pressure transducer from the present invention include the housing 71, diaphragm 92, and adapter 43. The housing 71 is connected to the header 42 at weld 69. The diaphragm 92 is mounted to the header 42 at weld 91. The adapter 43 is welded to the header 42 at weld 95.

The header 42 has a unique cavity 44 at end 46, which accepts a unique flame arrester 76. Cavity 44 extends deeper into header 42 at a peripheral portion than it does at a central portion and is defined at a central portion by a raised surface 48, and at an outer portion by a peripheral surface 50. Cavity 44 is further defined by vertical surface 52 and horizontal surface 54. A unique flame arrester 76, which is made from a suitable material, for example stainless steel, has a wide body shaped to be received into cavity 44 and is generally cylindrical in shape, with a downwardly extending peripheral portion 78, a thin central portion 80, and a transition 82. The flame arrester 76 has tight tolerances on its outer diameter that fits tightly into cavity 44 to create the proper small gap and minimum length at peripheral surface 50 to comply with flame arresting requirements. Flame arrester 76 contacts horizontal surface 54 and is secured in place by retaining ring 86, which fits partially into unique groove 88 in header 42 and in notch 84 of flame arrester 76. The unique groove 88 contains an angled surface 89, which mates with retaining ring 86, and prevents flame arrester 76 from vibrating during operation because it accounts for tolerance stack-up.

The header 42 with its cavity 44 permits mounting and connecting of sensor die 45 prior to insertion of flame arrester 76. Electrical conductive pins 66 are connected to sensor die 45 by wirebond connections (not shown) and extend through header 42. The electrical conductive pins 66 are isolated from the header body 42 by glass seals 67. Other electrical connections (not shown) are made at the other end of conductive pins 66.

The adapter 43 allows process fluid 41 to enter the pressure transducer and contact the diaphragm 92. The diaphragm 92 acts as a barrier between process fluid 41 and non-compressible fluid, e.g., oil. Oil fluid enters cavity 44 through opening 56 in header 42. Slot 72 in flame arrester 76 allows oil fluid to flow from peripheral surface 50 to vertical surface 52. Groove 74 in flame arrester 76 allows oil fluid to flow from opening 56 to slot 72 if slot 72 is not located above opening 56. From slot 72, oil fluid surrounds flame arrester 76 along peripheral surface 50. The oil fluid then moves through opening 87 in retaining ring 86 and fills the space under the diaphragm 92. From slot 72, oil fluid also surrounds flame arrester 76 along vertical surface 52 and fills the void or recess over surface 48 below flame arrester 76. An oil fill plug (not shown) plugs the opening 56 after the oil fill process is complete. The oil fluid transfers the pressure from the process fluid 41 to the sensor die 45.

The unique flame arrester 76 and its downwardly extending peripheral portion 78 combined with the unique cavity 44 and its raised surface 48 allows the sensor die 45 to be mounted closer to the process fluid 41. The minimum length requirement of the small gap at peripheral surface 50 is no longer positioned above sensor die 45. Sensor die 45 is temperature compensated to provide accurate readings when sensor die 45 is at the temperature of the process fluid 41. Thus, this smaller distance between sensor die 45 and process fluid 41 decreases the response time of the sensor die 45 to temperature changes in the process fluid 41.

The unique flame arrester 76 and its wide body shaped to be received into cavity 44 combined with the unique cavity 44 and its raised surface 48 allows mounting and wirebonding of the sensor die 45 directly into header 42. There is no need for an extra part such as a meter body found in prior art. The construction of header 42 also eliminates delicate welds near glass seals 67. The heat generated from welds may cause damage to glass seals because of the temperature related stresses caused by welding.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. A pressure transducer for sensing a pressure of a process fluid comprising:
   a header having a cavity on an outer face, said cavity partially defined by a first surface at a central portion and a peripheral wall;
   a sensing die located at said surface;
   conductors within said cavity;
   means for electrically connecting said sensing die to said conductors;
   a flame arrester having a shape for complementary receipt within said cavity with a flame arresting path being formed between said flame arrester and said peripheral wall,
   a diaphragm with a periphery of said diaphragm sealingly attached to said outer face of said header, said diaphragm transferring said pressure of said process fluid acting on an outer surface of said diaphragm to a fill fluid that contacts an inner surface of said diaphragm and surrounds said flame arrester, with a pressure of said fill fluid being sensed by said sensing die.

2. Pressure transducer of claim 1 wherein said flame arrester comprises a body having an upper surface, a downwardly extending peripheral portion and a recessed central portion opposite said sensing die.

3. Pressure transducer of claim 2 wherein said flame arresting path has a length greater than a distance from said sensing die to said upper surface.

4. Pressure transducer of claim 3 further comprising means for securing said flame arrester within said cavity.

5. Pressure transducer of claim 4 wherein said means for securing comprises a retaining ring.

6. Pressure transducer of claim 5 wherein said flame arrester has a peripheral notch and said header has a groove with said retaining ring being received in said peripheral notch and in said groove.

7. Pressure transducer of claim 6 wherein said groove has an angled surface which accounts for tolerance stack-up and prevents vibration during operation.

8. Pressure transducer of claim 2 wherein said downwardly extending peripheral portion includes a groove to allow passage of said fill fluid.

9. Pressure transducer of claim 3 wherein said surface is spaced from a bottom of said cavity to allow access to said sensing die and to position said sensing die to respond rapidly to changes in a temperature of said process fluid.

10. A pressure transducer for sensing a pressure of a process fluid comprising:
    a header having a cavity on an outer face, with a raised central portion of said header defining a central portion of said cavity and terminating in a first surface;
    a sensing means located at said first surface;
    means for electrically connecting said sensing means to connectors which extend outside said cavity;
    a flame arrester having a shape for complementary receipt in said cavity and extending over said sensing die with a flame arresting path formed between an outer surface of said flame arrester and said header; and a diaphragm having a periphery sealingly attached to said outer face of said header and transferring said pressure of the process fluid acting on an outer surface of said diaphragm, to a fill fluid surrounding said flame arrester with a pressure of said fill fluid being sensed by said sensing means.

11. Pressure transducer of claim 10 wherein said flame arrester comprises a generally cylindrical body having a downwardly extending peripheral portion and a recessed central portion opposite said sensing die.

12. Pressure transducer of claim 11 further comprising means for securing said flame arrester within said cavity.

13. Pressure transducer of claim 12 wherein said means for securing comprises a retaining ring.

14. Pressure transducer of claim 13 wherein said flame arrester has a peripheral notch and said header has a groove with said retaining ring being received in said peripheral notch and in said groove.

15. Pressure transducer of claim 14 wherein said groove has an angled surface which accounts for tolerance stack-up and prevents vibration during operation.

16. Pressure transducer of claim 15 wherein said downwardly extending peripheral portion includes a groove to allow passage of said fill fluid.

17. A pressure transducer for sensing a pressure of a process fluid comprising:
   a header having a first end and a second end;
   a cavity at said first end;
   a raised surface of said header within said cavity;
   conductors extending from said raised surface to said second end;
   a sensing die mounted at said raised surface and connected to said conductors;
   a cylindrical body having a downwardly extending peripheral portion, a recess in a bottom central portion and having an upper surface opposite said recess with a flame arresting path formed between said peripheral portion and said header with said flame arresting path having a length greater than a distance from said die to said upper surface; and
   a diaphgram with a periphery of said diaphragm sealingly attached to an outer face of said header, said diaphragm transferring said pressure of said process fluid acting on an outer surface of said diaphragm to a fill fluid that contacts an inner surface of said diaphragm and surrounds said flame arrester, with a pressure of said fill fluid being sensed by said sensing die.

18. Pressure transducer of claim 17 wherein said raised surface is spaced from a bottom of said cavity to allow access to said sensing die and to position said sensing die to respond rapidly to changes in a temperature of said process fluid.

19. Pressure transducer of claim 18 further comprising means for securing said flame arrester within said cavity.

20. Pressure transducer of claim 19 wherein said downwardly extending peripheral portion includes a groove to allow passage of said fill fluid.

* * * * *